Patented June 16, 1936

2,044,571

UNITED STATES PATENT OFFICE 2,044,571

COMPOSITIONS AND METHOD OF PRODUCING

Cleveland B. Hollabaugh, Wilmington, Del., assignor to Hercules Powder Company, Wilmington, Del., a corporation of Delaware No Drawing. Application December 23, 1933, Serial No. 703,833

15 Claims. (Cl. 134—79)

This invention relates to an improvement in compositions and method of producing same and more specifically relates to compositions of the type generally known as lacquer and lacquer enamel, adapted for application by spraying, dipping, or brushing.

Heretofore in connection with compositions of the type contemplated by this invention, it has been desired to have a composition containing a maximum solids content, while at the same time having a fluidity enabling it to be effectively applied by usual methods, such as brushing, spraying, dipping, and the like. In compositions of the type of lacquer and lacquer enamels, which include nitrocellulose as a base and usually in addition thereto various ingredients, such as a plasticizer, a gum or resin, a pigment, and the like, difficulty has been met in providing a composition of high solids content with retention of desired fluidity, due to the fact that nitrocellulose when dissolved in its usual solvents, tends to give a viscous as compared with a fluid solution where it is dissolved in any substantial concentration.

Various efforts have been made to produce compositions of the type of lacquer and lacquer enamel, containing nitrocellulose, with increased solids content and desired fluidity. The chief effort in such direction has been through the medium of reduction of the so-called viscosity characteristic of the nitrocellulose whereby an increased quantity thereof can be dissolved in a given amount of a solvent or solvent mixture without decrease of the fluidity of the resultant solution. Compositions of the type indicated and including nitrocellulose of reduced viscosity have been found desirable for many uses, but are not entirely satisfactory due to the fact that there are definite limits upon the increase in solids content, without undesirable decrease of fluidity, which may be obtained through the use of nitrocellulose of reduced viscosity characteristic; and due to the fact that nitrocellulose of reduced viscosity characteristic is incapable of forming as strong and durable a film as is nitrocellulose of relatively high viscosity, it being well known that nitrocellulose of relatively high viscosity characteristic will produce a film of superior strength, flexibility and durability as compared with nitrocellulose the viscosity characteristic of which has been reduced to enable increase in the solids content of a coating composition without undesirable decrease in fluidity.

Now in accordance with this invention a composition of the type of lacquer and lacquer enamel is provided and which is characterized by high solids content, with the use of nitrocellulose of either relatively high or relatively low viscosity characteristic and, at the same time, having desired fluidity adapting it for application by spraying, dipping, brushing, or the like.

Further, the composition in accordance with this invention will be capable of producing a film having great strength, flexibility and durability, due to the fact that high viscosity nitrocellulose may be used, and also films of very substantial greater thickness than heretofore produced with lacquers; all with great economy more particularly in the amount of solvent required. Further, clear coatings of high gloss, resistant to water and weather may be produced and, at the same time, pigmented films or coatings may be produced which will be relatively smooth or free from orange peel, and capable of polishing to a high gloss with a great deal less treatment, as by sanding, than in the case of prior pigmented films or coatings of the type. The composition will be found to be of especial advantage for application by brushing due to the fact that during the brushing on of a second coat over a previously applied coat, the solvents in the composition cannot attack the previously applied coat as they tend to do in the case of previously known lacquers, at the same time when the water has evaporated from the composition the solvents will be free to operate to bond the coats.

From the product standpoint, this invention involves in essence a solution of nitrocellulose, which may be of high or low viscosity, emulsified in water. The nitrocellulose, that is to say the nitrocellulose solution, constitutes the internal or disperse phase of the emulsion. Water constitutes the external or continuous phase. From the broad standpoint, the invention is characterized and differentiated from prior compositions by the fact that the volatile ingredients of the nitrocellulose solution are substantially immiscible with water; and that the dispersing or emulsifying agent used for obtaining the emulsion is such as to be soluble in the aqueous phase, will be active enough to give a stable emulsion, will be compatible with nitrocellulose in the quantity necessary to obtain a satisfactory emulsion, i. e., will not segregate from and will form an integral part of or a single phase with the dried nitrocellulose film or coating and will not react with the nitrocellulose to render the film unsuitable for such purpose as it is intended. Desirably, the dispersing or emulsifying agent will be soluble in the nitrocellulose solution.

More specifically, from the product standpoint, this invention contemplates the inclusion in the nitrocellulose solution, emulsified in water, of ingredients variously heretofore commonly used in lacquers and lacquer enamels, such as plasticizers, gums, resins, pigments, etc., as may be desired.

From the process standpoint, this invention contemplates the preparation of a nitrocellulose solution, using a nitrocellulose of any desired viscosity characteristic and in desired amount within wide limits, and a solvent or solvent mixture, together with any other ingredients which may be desired to be included in the final composition, and separately preparing a solution of a suitable emulsifying agent in water, with final admixture of the two solutions in a manner to effect emulsification of the nitrocellulose solution in internal phase in the water.

Compositions in accordance with this invention may contain nitrocellulose of substantially any desired viscosity characteristic depending upon the use for which the composition is intended. Thus, by way of example, compositions in accordance with this invention may contain nitrocellulose of low viscosity characteristic, for example, one-quarter or one-half second, or nitrocellulose of relatively high viscosity, for example, from one-half second to eighty seconds, or higher if desired. It will be understood that by the term "seconds" I intend the commercial meaning of the word.

Various solvents and solvent mixtures for the nitrocellulose may be used so long as the solvent or solvent mixture is of such a character as to permit emulsification of the solution in water without precipitation of nitrocellulose. For use in coating non-absorbent surfaces the solvent or solvent mixture will preferably have a rate of evaporation lower than water and will boil (say) above about 140°C. A solvent or solvent mixture boiling within, for example, about the range 150–175° C. will be found to be satisfactory for use in coating non-absorbent surfaces. When the composition is for use on absorbent surfaces, the solvent or solvent mixture can be of somewhat lower boiling point or higher rate of evaporation with reference to water than described above.

As illustrative of solvents which may be satisfactorily used in adapting this invention to practice, in coating non-absorbent surfaces, for example, hexyl acetate, octyl acetate, butyl butyrate, butyl lactate, amyl propionate, amyl butyrate, cellosolve acetate, ethyl acetyl glycollate, fenchone, methyl cyclohexanone, cyclohexanol acetate, or mixtures thereof may be used. For the coating of absorbent surfaces, for example, butyl acetate, butyl propionate, amyl acetate, etc., or mixtures thereof may be used as the solvent. Various diluents having similar characteristics from the standpoint of boiling point and which are substantially immiscible with water, such as xylol, petroleum naphtha, toluol, butyl alcohol, amyl alcohol, or mixtures thereof, may be included.

Various dispersing or emulsifying agents may be used so long as the dispersing or emulsifying agent is soluble in water, and preferably also in the nitrocellulose solution, is in quantity necessary to be used, compatible with, i. e., will not segregate from and will form an integral part of, or a single phase with the dried nitrocellulose film or coating, and will not react with the nitrocellulose to render the film unsuitable for such purpose as it is intended; and is of sufficient power to produce a stable emulsion. As illustrative of dispersing or emulsifying agents, for example, sodium, potassium, lithium, or the like, salts of the higher aliphatic sulphates, preferably containing eight or more carbon atoms, such as, for example, sodium oleyl sulphate, sodium lauryl sulphate, sodium stearyl sulphate, sodium myristyl sulphate, sodium cetyl sulphate, etc., or mixtures thereof, or other compounds equivalent therefor, will be found to be entirely satisfactory.

As has been indicated, compositions in accordance with this invention may include, in addition to nitrocellulose, various ingredients generally used in the formulation of lacquers and lacquer enamels, or ingredients which may be desired. Thus, for example, plasticizers as dibutyl phthalate, tricresyl phosphate, triphenyl phosphate, etc., may be used. Gums or resins, fossil or synthetic, as dammar gum, methyl or ethyl abietate, glycerol phthalates, ester gum, etc., may be used. Various pigments such as titanium dioxide, zinc sulphide, carbon black, Prussian blue, or dyes heretofore used in lacquers, may be used. In fact, any desired or heretofore known lacquer ingredients may be included. It will be understood that with various compositions the emulsifying agent will be used in amount not substantially in excess of that necessary to give a stable emulsion and, for example, will usually be used in amount within about the range 0.0–1.5% by weight of the water solution.

As illustrative of the practical adaptation of this invention, for example, for the production of a coating composition in accordance therewith, a clear lacquer is made up on the following formula:

|  | Parts |
|---|---|
| ½ second nitrocellulose | 30 |
| Water | 9 |
| Dibutyl phthalate | 12 |
| Ester gum | 24 |
| Hexyl acetate | 46 |

In making up the clear lacquer on the above formula, water-wet nitrocellulose is used, the nitrocellulose carrying about 30% water and which accounts for the water component of the formula. The water does not dissolve in the solution, but is emulsified in internal phase in the solution.

The clear lacquer solution in accordance with the above formula is mixed with a solution of suitable emulsifier in water, as, for example, a solution comprising 0.2 parts sodium lauryl sulphate and 41.0 parts distilled water. The mixture is passed through a homogenizer or colloid mill in order to emulsify the clear lacquer solution as the internal phase in the sodium lauryl sulphate-water solution, which will form the external phase.

The above composition, prepared as described, will comprise a uniform stable emulsion which will be noted to have a high solids content, but which, at the same time, will be of a fluidity or viscosity enabling it to be readily sprayed or brushed.

The composition or lacquer above illustrated will contain about 18.5% of one-half second nitrocellulose. A lacquer composition as heretofore known and of comparable spraying or brushing capacity could not exceed a one-half second nitrocellulose content of 10–11%. It will be noted that with nitrocellulose compositions of lacquers in accordance with this invention, thicker and heavier films or coatings may be formed with a single application than with nitrocellulose lacquers heretofore known. The composition when applied to a surface, as by spraying, will, on drying, produce a clear, glossy film equal in every way to lacquer films heretofore produced.

As further illustrative of the practical adaptation of this invention, for example, a clear lacquer solution is made up on the following formula, using water-wet nitrocellulose carrying about 30% of water:

| | Parts |
|---|---|
| 5 second nitrocellulose | 15 |
| Water | 4.5 |
| Dibutyl phthalate | 7 |
| Dammar gum (dewaxed) | 4 |
| Amyl propionate | 74 |

The clear lacquer solution is then emulsified by admixture with a solution comprising, for example, 0.5 parts sodium stearyl sulphate in 43.5 parts distilled water and passing the mixture through a homogenizer or colloid mill. The resultant mixture will be a uniform, stable emulsion, the lacquer solution being in disperse or internal phase and the composition being of relatively high solids content, but, at the same time, of desirable fluidity or viscosity enabling its application by spraying or brushing. It will be noted that the above illustrative composition includes nitrocellulose of relatively high viscosity and of a viscosity such as to prevent its use in prior lacquers in the amount indicated and, at the same time, give a lacquer which could be sprayed or brushed.

It will be noted that the five second nitrocellulose content of the above composition, amounting to 10%, about equals the maximum content of one-half second nitrocellulose capable of being used in prior lacquer compositions without loss of spraying capacity. Thus, with compositions according to this invention, superior films or coatings may be obtained due to the use of relatively high viscosity nitrocellulose as compared with low viscosity nitrocellulose. In prior lacquer compositions when five-second nitrocellulose was used a nitrocellulose content of 5% could not be exceeded without loss of spraying capacity; hence it will be observed that the above composition containing 10% of five-second nitrocellulose is capable of producing with one application a film or coating of twice the thickness heretofore possible.

As further illustrative, for example, a lacquer enamel made up on for example the following formula:

| | Parts |
|---|---|
| 5 second nitrocellulose | 15 |
| Water | 4.5 |
| Dibutyl phthalate | 6 |
| Ester gum | 12 |
| Zinc sulphide | 4.80 |
| Carbon black | 0.20 |
| Prussian blue | 0.25 |
| Butyl butyrate | 57.0 | is emulsified as described above in a solution of, for example, 0.5 parts sodium lauryl sulphate in solution in 45.5 parts of distilled water. The resultant composition will be a uniform, stable emulsion with the lacquer enamel solution in disperse or internal phase. Despite the relatively high content of relatively high viscosity nitrocellulose, the emulsion will be of desired fluidity or viscosity for application by spraying or brushing. When applied to a surface, as, for example, by spraying, and dried, the resultant film will be free from orange peel and will take a high gloss when lightly sanded and polished. It will be noted that the amount of sanding and polishing necessary to give to the film a high gloss will be very substantially less than that necessary in the case of prior lacquer enamels.

As a further illustration for example, a lacquer enamel may be made up on the following formula:

| | Parts |
|---|---|
| ½ second nitrocellulose | 20 |
| Water | 6 |
| Tricresyl phosphate gum | 10 |
| Dammar gum (dewaxed) | 5 |
| Carbon black | 4 |
| Hexyl acetate | 65 | and the lacquer enamel emulsified in a solution comprising 0.5 parts sodium myristyl sulphate and 44 parts of distilled water. Emulsification may be effected as described above by mixing the lacquer enamel solution with the aqueous solution of sodium myristyl sulphate and passing through a homogenizer or colloid mill. The emulsion will, as in the case of previous illustrations, be found to be a uniform, stable emulsion of the lacquer enamel solution in disperse or internal phase and to be of a fluidity enabling its ready application by brushing or spraying. The composition on drying will produce a film having desired characteristics and one which may be polished to a high gloss with light sanding.

As a still further illustration, for example, a lacquer enamel may be made up on the following formula:

| | Parts |
|---|---|
| 5 second nitrocellulose | 15.0 |
| Water | 4.5 |
| Dibutyl phthalate | 7.0 |
| Synthetic resin | 4.0 |
| Para toner | 5.0 |
| Carbon black | 0.25 |
| Hexyl acetate | 74.0 | and as above described, emulsified in a solution comprising, for example, 0.5 parts of sodium lauryl sulphate and 45.0 parts of distilled water. The emulsion, despite its relatively high content of relatively high viscosity nitrocellulose, will be of desired fluidity for application by spraying or brushing and on drying will produce a film comparable in desired characteristics with films produced with prior lacquer enamels.

The compositions illustrated above, it will be noted, include solvents of lower evaporation rate than water. The several compositions may be applied effectively to either absorbent or non-absorbent surfaces. When any of the above compositions are to be applied to absorbent surfaces, water-immiscible solvents or solvent mixtures of somewhat lower boiling point or higher rate of evaporation may be substituted for those indicated in the several formulæ.

In the drying of coating compositions in accordance with this invention applied to a non-absorbent surface, such as a metal surface, for example, by spraying, brushing, dipping, or the like, the water content of the composition or emulsion will be first removed, together with more or less solvent, depending upon the particular solvent used, for example, by evaporation, such being readily accomplished due to the use of solvent or solvent mixture of slower evaporation rate than that of water. After removal of the water the solvent or residual solvent will be removed, as by evaporation to effect normal deposit of a film.

In the drying of coating compositions in accordance with this invention, applied to an absorbent surface, such as paper, bare wood, or the like, for example by spraying, brushing, dipping, or the like, the water content of the composition or emulsion will be first removed by absorption or by absorption and evaporation and the film or coating finally dried.

After the removal of the water from the composition after its application, the solvent or solvent mixture will be evaporated with normal deposit of the film comprising nitrocellulose and such other ingredients as may have been incorporated therewith, such as plasticizer, gum or resin, pigment, etc.

The films or coatings produced with compositions in accordance with this invention will be of superior characteristics, such as resistance to light, storage, weathering, resistance to abrasion, resistance to water, flexibility, etc.

In connection with this invention and more particularly with respect to the claims appended hereto, it will be understood that the term "lacquer" includes broadly any nitrocellulose solution with or without components in addition to nitrocellulose such as, for example, a plasticizer, a gum or resin, a pigment, etc., ingredients heretofore commonly used in coating compositions of the type generally known as lacquers. It will be understood that the terms "lacquer" and "lacquer enamel" used herein are, from the broad standpoint, used synonymously, the terms being differentiated from the specific standpoint only by the fact that the term "lacquer enamel" indicates a pigmented composition as compared to indication of an unpigmented composition by the term "lacquer".

What I claim and desire to protect by Letters Patent is:

1. A composition including a solution of nitrocellulose in a solvent which is substantially immiscible with water, said solution being emulsified as the internal phase in water containing an emulsifying agent comprising a salt of a higher aliphatic sulphate in an amount sufficient to produce a stable emulsion capable of producing on drying a smooth continuous film.

2. A composition including a solution of nitrocellulose in a solvent which is substantially immiscible with water, said solution being emulsified as the internal phase in water containing an emulsifying agent comprising a salt of a higher aliphatic sulphate containing eight or more carbon atoms in an amount sufficient to produce a stable emulsion capable of producing on drying a smooth continuous film.

3. A composition including a solution of nitrocellulose in a solvent which is substantially immiscible with water, said solution being emulsified as the internal phase in water containing an emulsifying agent comprising sodium lauryl sulphate in an amount sufficient to produce a stable emulsion capable of producing on drying a smooth continuous film.

4. A composition including a solution of nitrocellulose in a solvent which is substantially immiscible with water and having a lower rate of evaporation than water, said solution being emulsified as the internal phase in water containing an emulsifying agent comprising a salt of a higher aliphatic sulphate in an amount sufficient to produce a stable emulsion capable of producing on drying a smooth continuous film.

5. A composition including a solution of nitrocellulose in a solvent which is substantially immiscible with water, said solution being emulsified as the internal phase in water containing an emulsifying agent comprising an alkali metal salt of a higher aliphatic sulphate in an amount sufficient to produce a stable emulsion capable of producing on drying a smooth continuous film.

6. A composition including a solution of nitrocellulose in a solvent which is substantially immiscible with water, said solution being emulsified as the internal phase in water containing an emulsifying agent comprising an alkali metal salt of a higher aliphatic sulphate containing eight or more carbon atoms in an amount sufficient to produce a stable emulsion capable of producing on drying a smooth continuous film.

7. A composition including a solution of nitrocellulose in a solvent which is substantially immiscible with water, said solution being emulsified as the internal phase in water containing an emulsifying agent comprising sodium cetyl sulphate in an amount sufficient to produce a stable emulsion capable of producing on drying a smooth continuous film.

8. A composition including a solution of nitrocellulose in a solvent which is substantially immiscible with water, said solution being emulsified as the internal phase in water containing an emulsifying agent comprising sodium stearyl sulphate in an amount sufficient to produce a stable emulsion capable of producing on drying a smooth continuous film.

9. A composition including a solution of nitrocellulose in a solvent which is substantially immiscible with water and having a lower rate of evaporation than water, said solution being emulsified as the internal phase in water containing an emulsifying agent comprising sodium lauryl sulphate in an amount sufficient to produce a stable emulsion capable of producing on drying a smooth continuous film.

10. A composition including a solution of nitrocellulose in a solvent which is substantially immiscible with water and having a lower rate of evaporation than water, said solution being emulsified as the internal phase in water containing an emulsifying agent comprising sodium cetyl sulphate in an amount sufficient to produce a stable emulsion capable of producing on drying a smooth continuous film.

11. A composition including a solution of nitrocellulose in a solvent which is substantially immiscible with water and having a lower rate of evaporation than water, said solution being emulsified as the internal phase in water containing an emulsifying agent comprising sodium stearyl sulphate in an amount sufficient to produce a stable emulsion capable of producing on drying a smooth continuous film.

12. A composition including a solution of nitrocellulose in a solvent boiling above 140° C. which is substantially immiscible with water, said solution being emulsified as the internal phase in water containing an emulsifying agent comprising an alkali metal salt of a higher aliphatic sulphate in an amount sufficient to produce a stable emulsion capable of producing on drying a smooth continuous film.

13. A composition including a solution of nitrocellulose in a solvent boiling within the range about 150° C. to about 170° C. which is substantially immiscible with water, said solution being emulsified as the internal phase in water containing an emulsifying agent comprising an alkali metal salt of a higher aliphatic sulphate in an amount sufficient to produce a stable emulsion capable of producing on drying a smooth continuous film.

14. A composition including a solution of nitrocellulose in a solvent which is substantially immiscible with water, said solution being emulsified as the internal phase in water containing an emulsifying agent comprising an alkali metal salt of a higher aliphatic sulphate in amount sufficient to produce a stable emulsion capable of producing on drying a smooth continuous film and not in excess of about 1.5% by weight of the water.

15. A composition including a solution of nitrocellulose and a resin in a solvent which is substantially immiscible with water, said solution being emulsified as the internal phase in water containing an emulsifying agent comprising an alkali metal salt of a higher aliphatic sulphate in an amount sufficient to produce a stable emulsion capable of producing on drying a smooth continuous film.

CLEVELAND B. HOLLABAUGH.